United States Patent [19]
Boyer et al.

[11] Patent Number: 5,713,548
[45] Date of Patent: Feb. 3, 1998

[54] SYSTEM FOR RETAINING A COMPUTER OR OTHER ARTICLE ON THE HUMAN BODY

[76] Inventors: Gregory B. Boyer; Gaylord B. Boyer, both of 3124 Mason Way, Modesto, Calif. 95355

[21] Appl. No.: 428,565

[22] Filed: Apr. 25, 1995

[51] Int. Cl.⁶ .................................................. A44B 1/08
[52] U.S. Cl. .................. 248/205.2; 108/43; 224/222; 224/267; 224/901
[58] Field of Search .................... 248/205.2, 4.44, 248/690, 682, 918, 444; 224/901, 267, 222; 108/43

[56] References Cited

U.S. PATENT DOCUMENTS

| | | | |
|---|---|---|---|
| 3,878,849 | 4/1975 | Muller et al. | 128/349 R |
| 4,569,348 | 2/1986 | Hasslinger | 604/179 |
| 4,966,322 | 10/1990 | Zagorski | 224/267 |
| 5,176,259 | 1/1993 | Andersen | 248/205.2 X |
| 5,221,031 | 6/1993 | Prigmore | 224/267 |
| 5,244,464 | 9/1993 | Madden et al. | 604/179 |
| 5,255,612 | 10/1993 | Anderson | 108/43 |
| 5,263,423 | 11/1993 | Anderson | 108/43 |
| 5,289,619 | 3/1994 | Pileggi | 24/306 |
| 5,309,328 | 5/1994 | Lum | 224/267 X |
| 5,352,209 | 10/1994 | Bird et al. | 604/179 |
| 5,412,545 | 5/1995 | Rising | 362/105 |
| 5,415,183 | 5/1995 | Somers | 128/875 |

*Primary Examiner*—Ramon O. Ramirez
*Attorney, Agent, or Firm*—Thomas M. Freiburger

[57] ABSTRACT

A securement device provides for efficient, releasable attachment of an electronic device or other article to the human body, such as on the lap or at any other appropriate anchor point. The securement device, which prevents the electronic device from slipping or dropping, features an encircling strap and coacting strips of hook-and-loop fastener material. Through the hook-and-loop strips, the strap secures itself around a limb or limbs or other appropriate anchor point while also holding the device. A first variation enables the user to secure one or more articles such as a laptop computer on the lap using a non-elastic strap which encircles both legs at the thighs. A second variation enables the user to secure a smaller device such as a palmtop computer or cellular telephone to a single thigh or to an arm. This version can make use of an elastic strap of generally greater width and shorter length. In another application a strap of the invention can be used to secure a portable device to an airplane fold-down tray. Another form of the strap device has a strip of non-slip material on its top surface to simply retain a hand-manipulable device by friction. Straps can vary in width depending on application.

12 Claims, 8 Drawing Sheets

SYSTEM FOR RETAINING A COMPUTER OR OTHER ARTICLE ON THE HUMAN BODY

BACKGROUND OF THE INVENTION

This invention relates to the safety and stability of portable electronic devices and other articles through their attachment to a human appendage or appendages.

U.S. Pat. No. 5,263,423 to Rolf Anderson shows an article securement device. Anderson's device enables a user to secure a laptop computer to one of his or her legs by means of a table, braces, and various straps. The device attaches to only one leg of the user and depends upon use of the intervening table and braces and two attaching straps. With Anderson's device, the laptop computer is strapped to the intervening table which in turn is strapped to the leg. Anderson's use of the intervening table and braces and a second strap makes his device comparatively bulky and cumbersome and greatly reduces its ease of use and portability. Also, the attachment of Anderson's supposed lapboard device to only one leg results in an unstable foundation and could lead to the user's drawing the leg strap very tight. The attachment to only one leg also causes the user to access the keyboard of the laptop computer from an inconvenient angle rather than straight-on. Working with the computer at this angle may lead to data entry error and to strained posture and discomfort.

U.S. Pat. No. 4,966,322 to Joseph Zagorski shows "an adjustable elastic band . . . which fits around the upper arm of the user with a strap secured to the band having Velcro fasteners thereon so that the strap can be secured around ski goggles to retain the goggles against the upper outer side of the arm of the wearer."

U.S. Pat. No. 5,244,464 to Diane Madden shows a band for securing and aligning medical tubing to a portion of a human body (e.g. head, arm, chest, leg, etc.) by means of hook and loop fasteners. This device is akin to various other patented devices that make use of hook and loop attachments to the human body. Madden pertains only to medical tubing.

Also, knee boards for pilots have been in use for many years. ASA of Renton, Wash. produces a knee board under the designation KB-1, which includes a small, hard board securable to the top of one leg using a strap that encircles the leg.

Nothing in the prior art discloses a simple, efficiently used strap device for retaining a laptop computer or other appliance or article comfortably on the body, in a way which facilitates efficient use of the device, as in the invention described below.

SUMMARY OF THE INVENTION

A securement device according to the invention, for releasable attachment of a laptop computer or other appliance or article to a user's appendage or appendages includes a strap component to encircle the appendages. The outer surface of the strap component, near one end, has male VELCRO-type material, i.e. hook material, secured to the surface. On the same outer surface at an opposite end of the strap is a component of female VELCRO-type (loop) material secured to the strap component. The inner or under surface of the strap component, near the one end, has another patch of male VELCRO material. When the strap component encircles the appendage or appendages all VELCRO strips are positioned so as to allow the strap component to be secured around the appendage(s) so as to allow male VELCRO material to face upward. This allows the attachment of one or more female VELCRO strips that are adhered to a surface of an electronic device or other appliance.

In another form of the invention a securing strap is constructed similarly to the above but with a different material exposed upwardly to retain the computer, lapboard or other device on top of the user's thighs. A high-friction fabric material replaces the upwardly-facing hook (VELCRO) material with no requirement of any hook and loop fasteners or other attachment to the bottom of the device to be retained. This form of strap can be used to retain meal (lap) trays on the legs of persons, in addition to being useful for all of the items mentioned above, particularly in situations where the stronger retention of VELCRO hook and loop fasteners material is not needed.

It is therefore among the objects of the invention to facilitate a straightforward, stable and efficient way for a seated person to secure an article, particularly an article to be manipulated by the hands, onto the user's lap or onto a single appendage. This is done with a minimum of equipment, involving a compactly stored and easily used strap which has hook and loop material positioned at certain locations, including in a position for engagement with the article to be secured, such as a laptop computer. These and other objects, advantages and features of the invention will be apparent from the following description of a preferred embodiment, considered along with the accompanying drawings.

DESCRIPTION OF PREFERRED EMBODIMENTS

Figure 1:
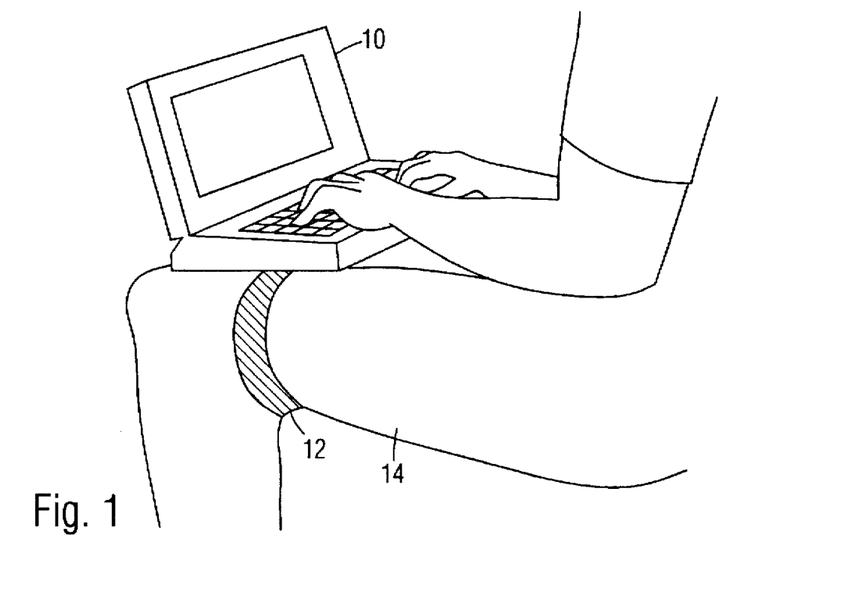
FIG. 1 is a perspective view showing a person using an electronic device secured to the lap of the user by means of a securement device in accordance with the invention.

FIG. 1 shows a seated person with a device 10, ordinarily a hand-manipulable device (shown as a laptop computer) secured onto his or her lap by means of the securement device of the invention which includes a strap component 12. In the case of thigh-encircling application of securement device, the material of strap 12 is comprised of synthetic or natural material, e.g., nylon or polyester webbing, cloth, or leather which may be of varying widths. The width of the strap in a preferred embodiment is at least about ¾ inch and may be about 3 inches or wider. In applications where the strap circles both thighs 14, the device 10 is generally centered between the user's thighs 14 and at such a distance from the user's body so as to allow a natural and straight-on position of the user's hands on the keyboard or writing area. This centered position of the device also allows the user to look straight ahead at both the display panel of the device, and at anything else of relevance, e.g. a page on a display stand or a person being interviewed.

Figure 2:
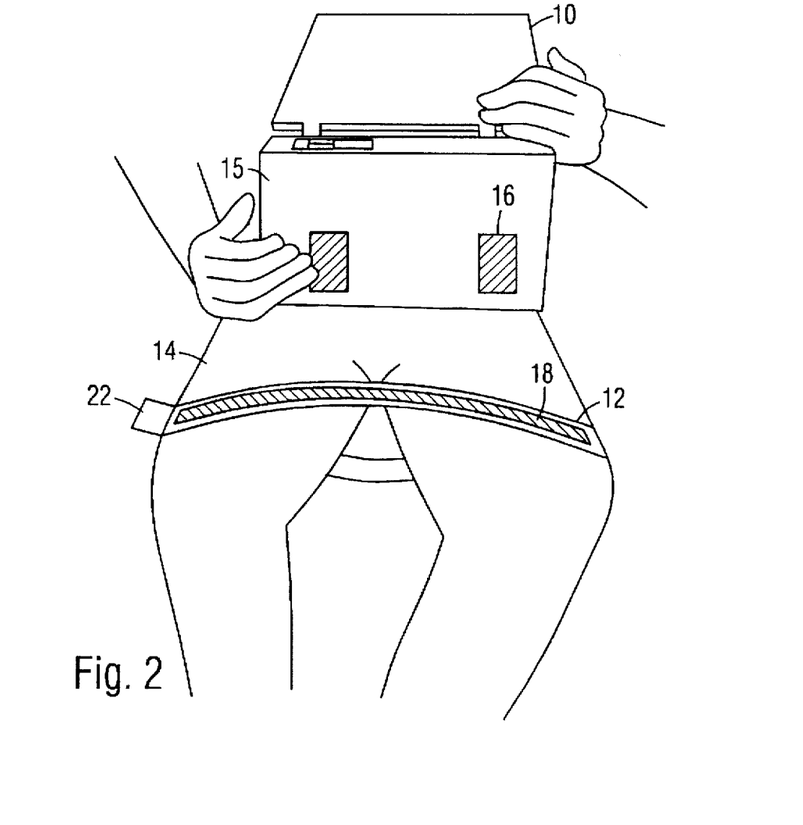
FIG. 2 is a front view illustrating how the patches of female hook and loop material (VELCRO) adhered to the underside of the electronic device align with male hook-and-loop material on the strap component of the securement device.

FIG. 2 shows a user of the device 10 holding it up to expose the underside 15. A self-adhesive strip of female hook-and-loop material (i.e. loop material) 16 can be seen on either side of the underside of the device 10. When the device 10 is positioned in the lap on top of the thighs 14, the self-adhesive strip of female loop material 16 adheres to a male mating strip 18 secured to and extending across the upper, outer surface of the strap 12. The male or hook material may be secured by sewing. The strap 12 is attached to itself through the coacting attachment of a female loop material strip 24 and a male hook material strip 26, as seen in FIGS. 3–6. The hook strip 26 is secured adjacent to and inward of a female or loop tab 28 secured on the underside of a pulltab 22 at a first or outer end of the strap. The pulltab 22 can be seen protruding outward from the thigh in FIG. 2 so as to provide a means by which the strap 12 can be grasped and pulled away from itself to release it from its encirclement around the thighs.

Although the self-adhesive strip of loop material 16 is shown in a specific position in FIG. 2, the position of the strip of loop material 16 is adjustable by the user to accommodate the unique arrangement of features on the attaching surface of the device 10 and the user's unique shape and size. Individual users have variable physical characteristics and proportions, e.g. thighs and arms of various lengths and girths.

FIGS. 3–6 show the invention, particularly the strap component 12, in some detail.

Figure 3:
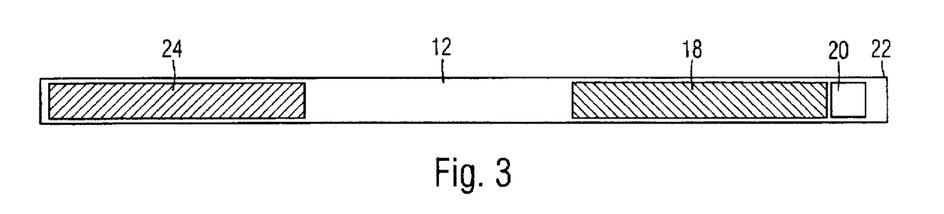
FIG. 3 is a top plan view showing the outer surface of the strap component of the securement device.

FIG. 3 is a top or outer side view of the strap 12 and its attached components. The top surface of the strap has attached to it, preferably by sewing, three components: the loop strip 24; an identifying label 20; and the male (hook) mating strip 18, which engages with the laptop computer or other device 10. The loop strip 24 is preferably sewn in position on the strap 12 starting at the end of the strap opposite that of the pulltab 22. The identifying label 20 is sewn to the strap 12 adjacent and inward from the pulltab 22, as shown. Adjacent and inward from the label 20 is sewn the male mating strip 18.

Figure 4:
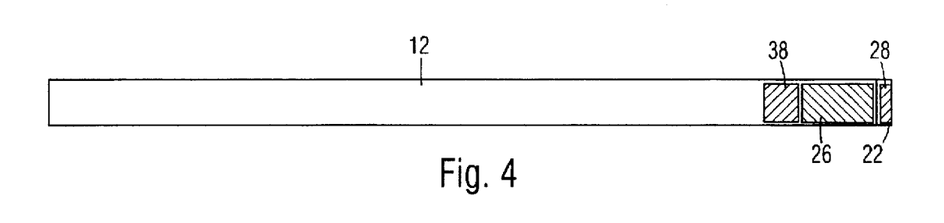
FIG. 4 is a bottom plan view showing the inner surface of the strap component of the securement device.

FIG. 4 is a bottom view of the strap 12 and its attached components. The loop tab 28 is sewn to the underside of the pulltab 22. The hook strip 26 is sewn to the bottom surface of the strap 12 adjacent to and inward from the pulltab 22, in part under the label 20. Fabric 38 is sewn adjacent to and inward from the loop strip 26. When the securement device is rolled into storage position (FIG. 10) this fabric 38 prevents the male (hook) mating strip 18 from directly contacting the underside of the strap 12 and from thereby potentially snagging and disfiguring the strap 12, which is preferably a woven synthetic material which can snag on the hook material. The patch of protective fabric 38 is not necessary when the strap 12 is made of a material not susceptible to snagging.

Figure 5:
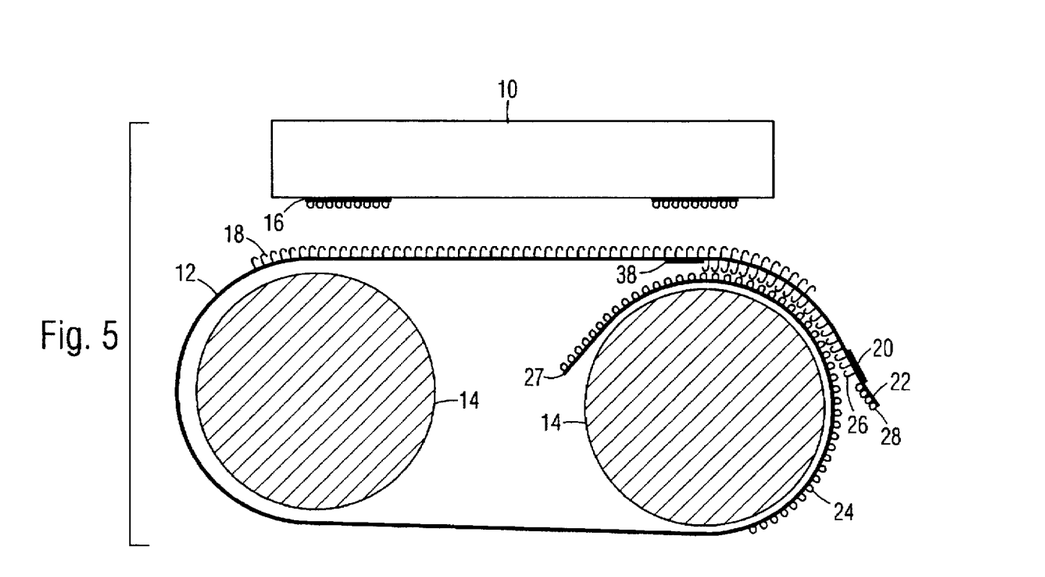
FIG. 5 is a cross-sectional exploded view illustrating a lap application of the securement device and assembly of components together.

FIG. 5 is a cross-sectional view of the securement device. To the upper or top surface of the strap 12 that encircles thighs 14 is sewn the male mating strip or hook strip 18. The self-adhesive strip of female loop material 16, adhered to the attaching surface of the device 10, engages with and attaches to the male mating strip 18 when the device 10 is placed on the strap. This attachment allows the device 10 to be securely and yet removably and reversibly attached to the encircling strap 12 and thereby to the lap of the user. The attachment is capable of quick and easy release. FIG. 5 also shows a second, inner end 27 extending loosely at one thigh, as excess length on the particular user shown. The strap 12 and its securement via overlap and engaged Velcro as shown in FIG. 5 can be reversed left to right if desired, depending on convenience of the user, with the identical function.

Figure 6:
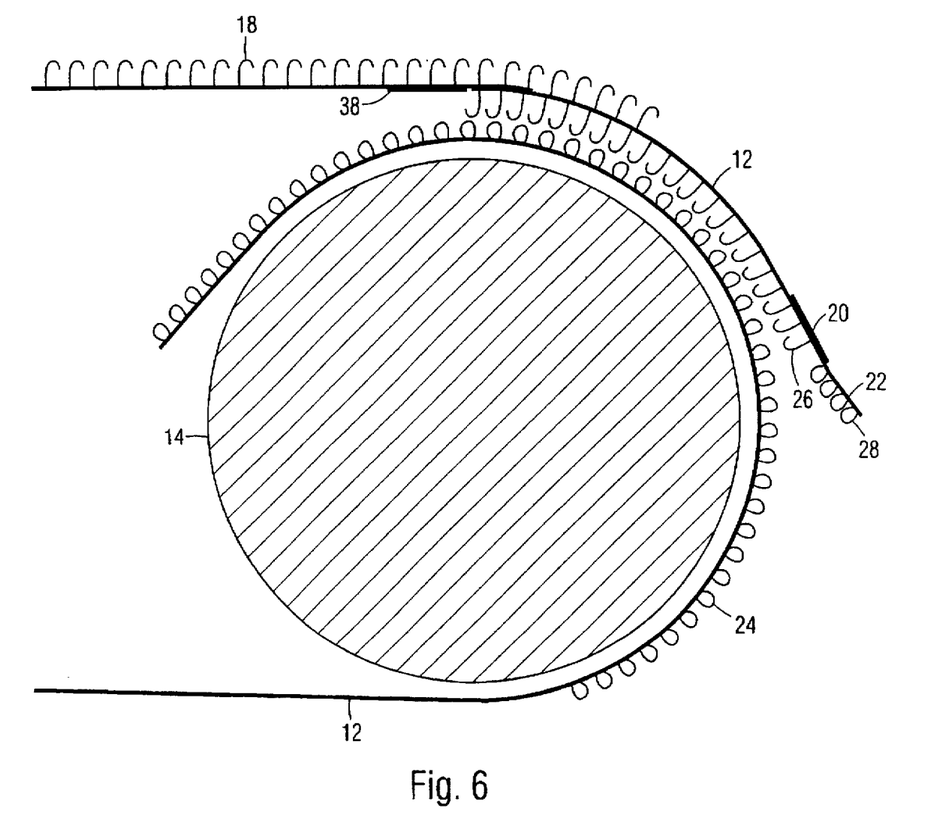
FIG. 6 is an enlarged cross-sectional view of a portion of FIG. 5, showing how the strap component adheres to itself during use.

FIG. 6 is a cross-sectional view showing in greater detail how the strap 12 is positioned and attached to itself during use. The hook strip 26 on the bottom side attaches to the loop strip 24 at any point in the length of the loop strip 24 that allows for proper fit of the strap around the thighs of the user. When the strap 12 encircles the thighs 14, the pulltab 22 protrudes slightly outward to allow the user easily to grasp it and release the attachment of the hook strip 26 from the female hook-and-loop strip 24. Such release enables the strap 12 to be removed from around the thighs 14. It should be understood that the term "attached to itself" in reference to the straps shown herein is intended to include connection by a buckle or cinching device, as an alternative to VELCRO hook and loop fastener material.

Figure 7:
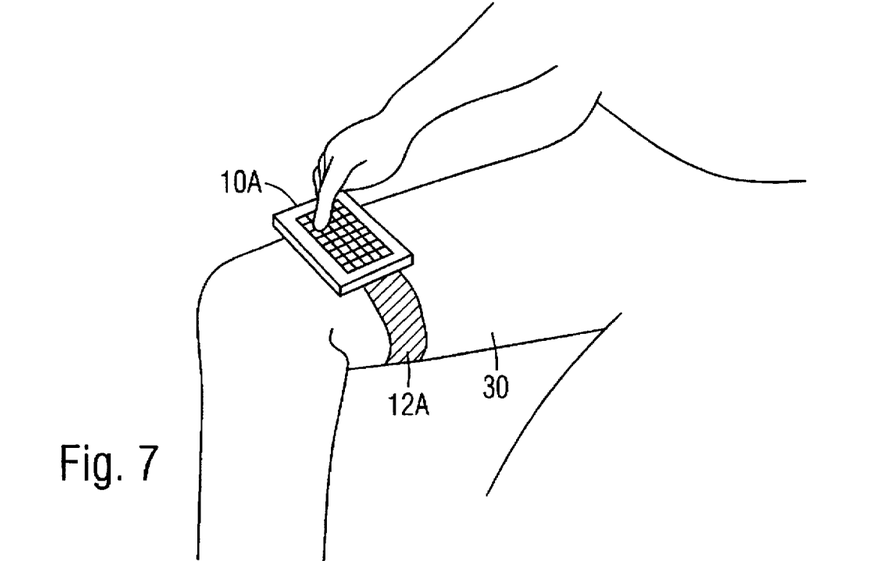
FIG. 7 is a perspective view showing a person using an electronic device attached to a single leg by means of the securement device, constituting an alternative embodiment of the invention.

FIG. 7 shows a seated person with another hand-manipulable device or article 10a secured onto a single thigh 30 by means of the securement device of the invention. A somewhat shorter strap 12a encircles the thigh 30 to provide an embodiment of the securement device that secures smaller electronic devices, such as Personal Digital Assistants (PDAs), electronic games, cellular phones, geopositional systems, etc. In an application to a single thigh 30, the strap 12a can be comprised of elastic material that encircles and grips the single thigh 30. In comparison to the double-thigh embodiment, the single-thigh application generally features a strap of shorter overall length and of greater width. Greater width is necessary to provide an adequate securement area around the thigh and an adequate device attachment area on the upper surface of strap 12a. Despite the dimensional variations between single-appendage and double-appendage versions of the securement device, the arrangement and coacting interrelationship of the various components of the device securement system as shown in FIGS. 3, 4, 5, 9 and 10 are generally the same.

Figure 8:
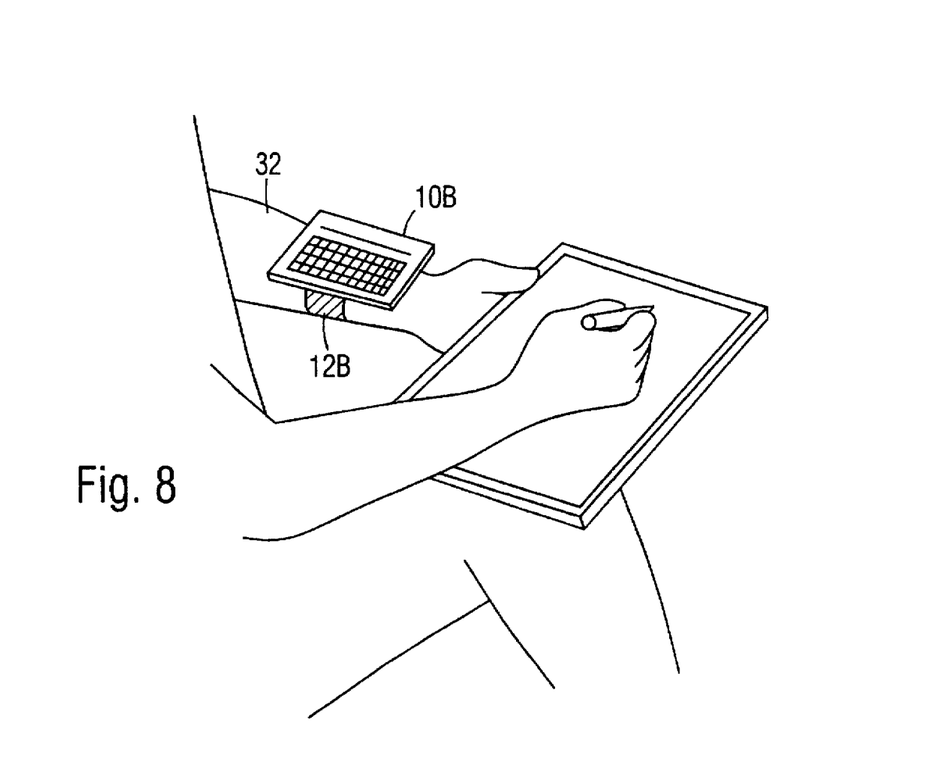
FIG. 8 is a perspective view showing a person using an electronic device attached to the forearm by means of the securement device of the invention.

FIG. 8 shows a user of a device 10b which is attached to a user's forearm 32 by means of a securement device of the invention, whose strap component 12b with its attached components is shown. This attachment is very similar to what is shown in and described relative to FIG. 6. The same strap as in FIG. 6 can be used, provided the hook and loop fastener material is correctly positioned.

Figure 9:
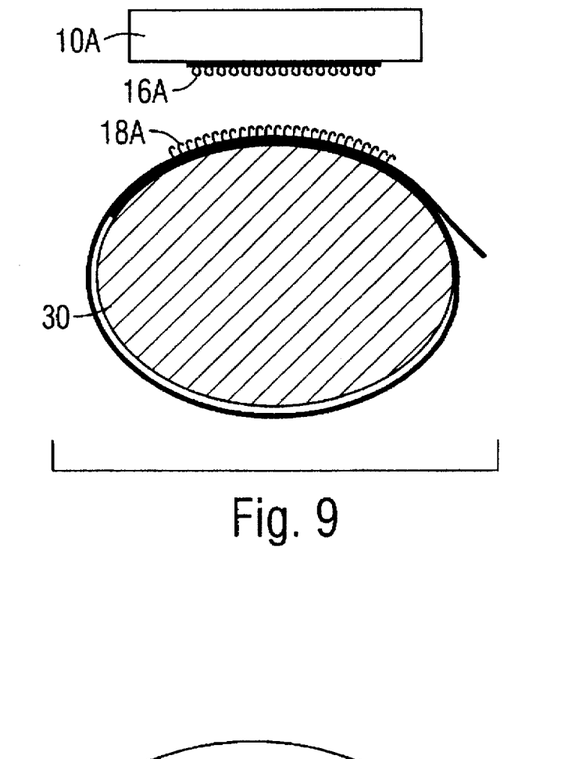
FIG. 9 is an exploded cross-sectional view showing a single thigh application of the securement device as in FIG. 7, and indicating assembly.

FIG. 9 is a cross-sectional view showing a thigh application of the securement device which accommodates the attachment of the smaller device 10a to a single thigh 30. As in other versions of the securement device, a preferably self-adhesive strip of loop material 16a attaches to a male (hook) mating strip 18a. In other respects FIG. 9 can be described similarly to the description of FIG. 5. FIG. 9 can also be considered to show the securement device as applied to a forearm as in FIG. 8, the only different being that the forearm is smaller than the thigh.

Figure 10:
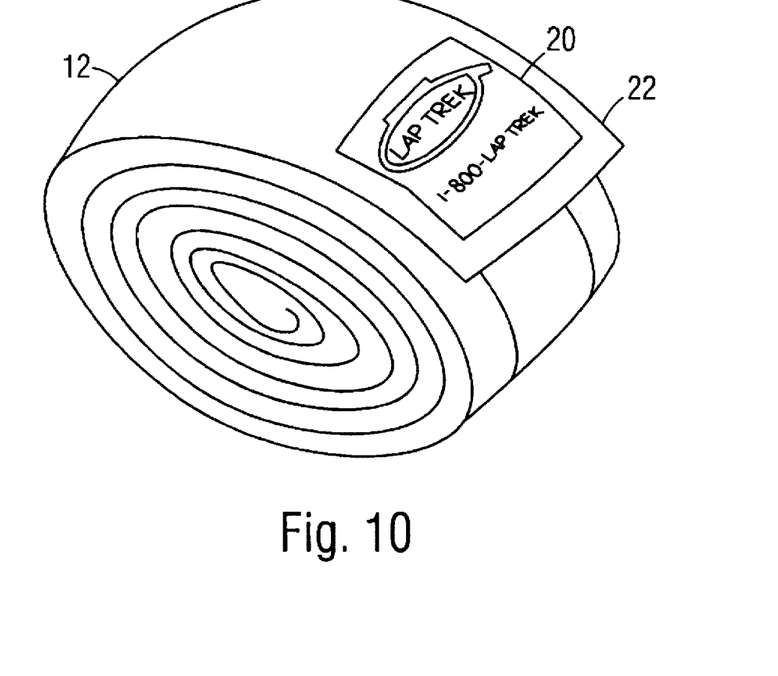
FIG. 10 is a perspective view illustrating the strap component of the securement device rolled into a storage position.

FIG. 10 illustrates the strap 12 of the securement device and its attached components coiled into a self-sealing roll for storage. The self-sealing function is enabled by engagement of the female, loop tab 28 to the male mating strip 18 as shown in FIG. 5. When the strap 12 is rolled into storage position as shown, the label 20 and the pulltab 22 are visually prominent. The shorter straps 12a and 12b described above can be rolled and secured in a similar manner.

Figure 11:
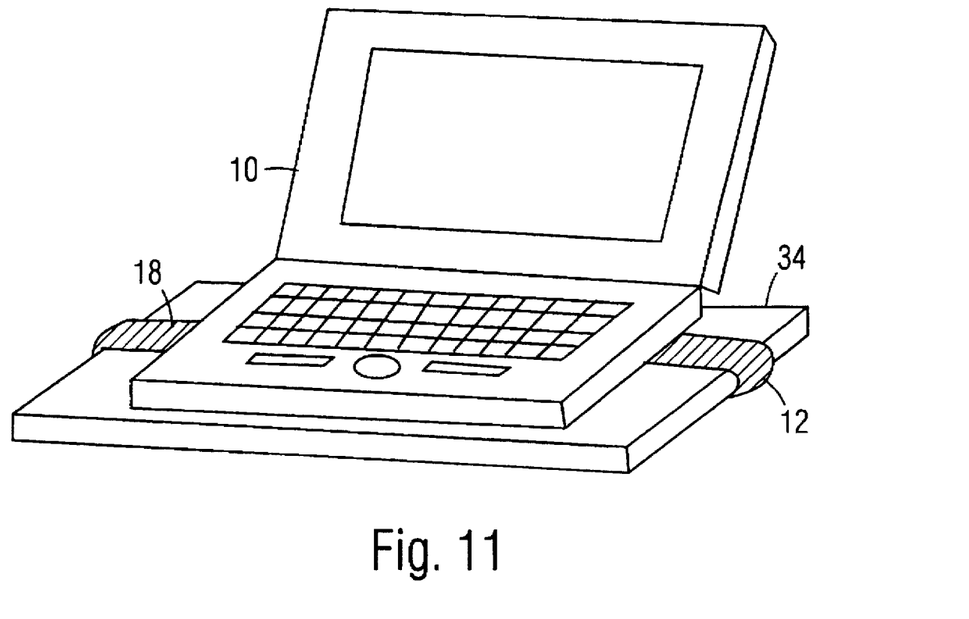
FIG. 11 is a perspective view illustrating how the strap of the securement device can be attached around an airplane fold-down tray.

FIG. 11 is a pictorial view showing how the securement device 12 of the invention can be attached around a lap desk or airplane fold-down tray 34. The tray 34 then fulfills the role of the lap in the double-thigh embodiment of the securement device, described above and shown in FIGS. 1–6.

In the airplane fold-down tray 34 application of the securement device, the strap 12 is fastened around the fold-down tray 34 instead of around the user's thighs 14. When positioned so that the male mating strip 18 faces upward, an attachment surface is provided for the components of the self-adhesive strip of loop material 16 adhered to the device 10 to be used (not shown in FIG. 11). Fastening and releasing of devices to the strap 12 is accomplished in the same manner as in the double-thigh application of the securement device.

Figure 12:
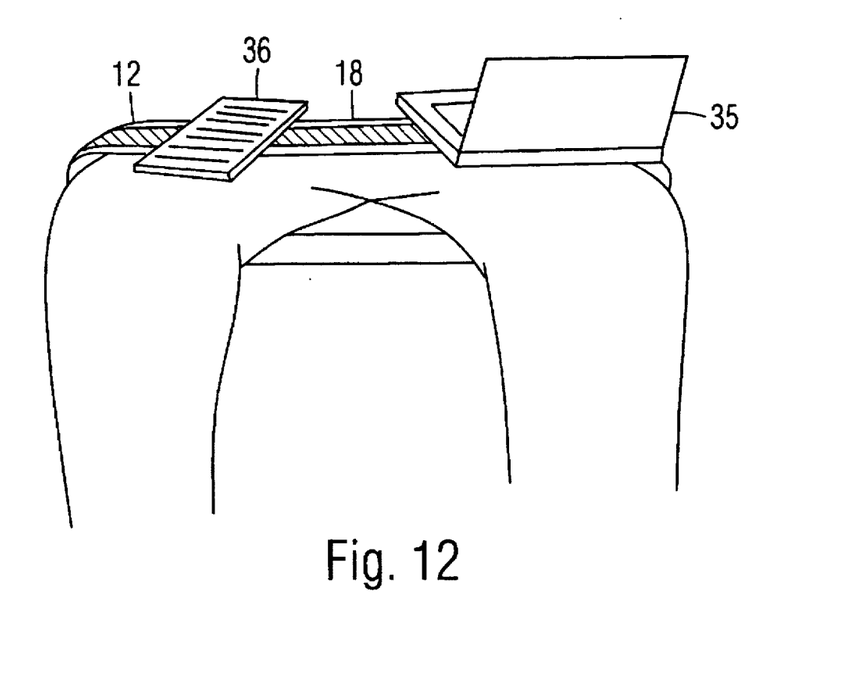
FIG. 12 is a perspective view illustrating how the securement device can be used to simultaneously secure two small devices or objects in the user's lap.

As shown in FIG. 12, when a small device 35 (such as a Personal Digital Assistant) is attached to the male mating strip 18 in the double-thigh embodiment by means of a self-adhesive strip of female loop material 16, the attachment area on the male mating strip 18 may be available for attachment of second small article 36 such as a clipboard, diary, cellular phone, etc. When a self-adhesive strip of female loop material 16 is adhered to the back of the second small article 36 (not shown in FIG. 12), the small article 36 can be secured to the strap 12 via the hook-and-loop fasteners. Such attachment enables securement of two small articles side-by-side in the user's lap as shown, thus increasing the secure utility of that workspace.

Figure 13:
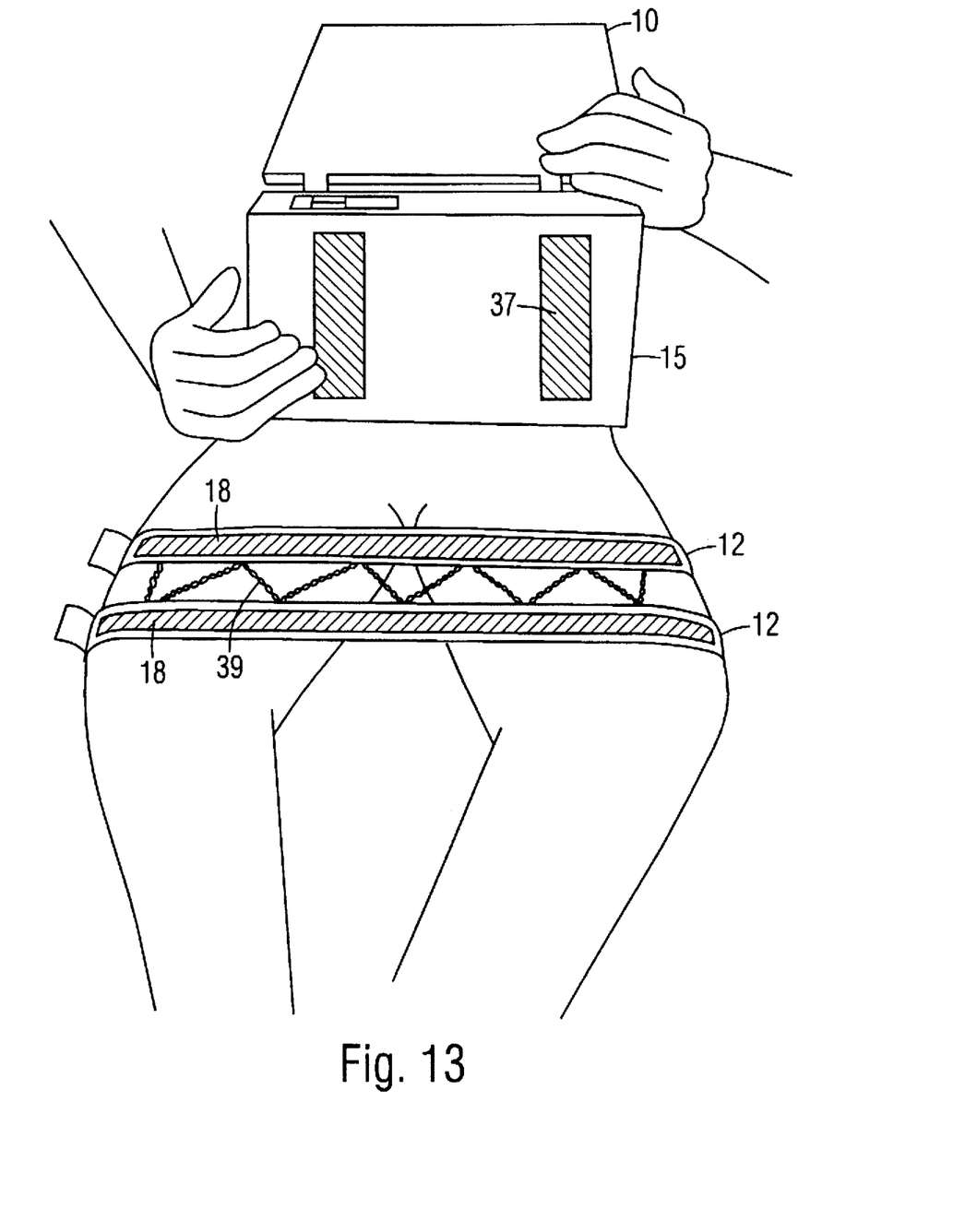
FIG. 13 is a frontal perspective view of a user, illustrating how a multiple strap version of the invention could be used in rugged environments where added security is needed.

FIG. 13 illustrates how a double strap application can be used in a rugged and highly unstable environment where greater security is required. A single wide strap can be used as an alternative. In this application a device 10 has larger self-adhesive strips of female loop material 37 attached to the bottom surface 15 of the device 10. The broader surface engages with the male mating strips 18 on the multiple straps 12. The multiple straps are connected with each other via fabric panel, webbing, cord or other similar flexible connecting materials 39. In the case of a full fabric panel connecting the multiple straps, male hook material can be sewn to cover any portion of the fabric panel to form in effect a wide strap. This gives a large attachment area that can provide tremendous holding power for special situations, e.g. competing while in off-road race cars or combat vehicles.

Operation

In FIG. 1, the user has adjusted the strap 12 comfortably around the thighs 14 at a point that enables the device 10 (e.g. laptop computer) to be at optimum and natural placement in relation to the hands. The strap 12 can be adjusted to any point along the thighs 14 if the user wishes to change the resting position of the attached device 10. The lap of the user as shown in FIG. 1 is situated in an essentially level position, with the user's knees at approximately the same level as the hips. Often when a user is seated in a chair or a vehicle, his knees will be higher or lower than his hips so that the lap is situated in a non-level position. The securement device secures the device 10 firmly in place in the user's lap and prevents slippage of the device 10 regardless of the lap angle or the motion being experienced by the user, e.g. in an erratically moving vehicle or aircraft.

Prior to the first use of the securement device, the user goes through an installation procedure that customizes the securement device to his or her unique shape and size. This installation procedure also determines where the user will adhere self-adhesive strips of the female, loop material 16 to the attaching surface of the device 10. In instructions that accompany the securement device, the user is instructed to place the strap 12 around the thighs 14 and to place the device 10 in his lap in a position that is at a natural and comfortable reach for the hands to rest on the working surface of the device 10. When the strap 12 of the securement device is adjusted along the thighs and beneath the device 10 so that a position of optimal utility and comfort is achieved, the user studies these relative positions and the unique features of device 10 to determine where self-adhesive strips of loop material 16 should be adhered to the attaching surface. The self-adhesive strip of loop material 16 is attached on either side of the attaching surface of the device 10 as shown, so as to provide a stable attachment to the strap 12.

The user also studies the attaching surface of the device 10 to see if certain areas of the loop material 16 need to be cut away to allow ongoing access to features on device 10 such as access panels, battery packs, peripheral device contact points, etc. To fit the unique features of the device 10, the self-adhesive strip of loop material 16 is trimmed as necessary.

To adhere the components of the self-adhesive strip of loop material 16 to the attaching surface of the device 10, the user lays the device 10 on a stable surface, cleans the attaching surface of the device and applies the strips.

FIG. 5 shows how the strap 12 is affixed adjustably and reversibly around thighs 14. FIG. 5 also shows how device 10 is then secured adjustably and reversibly to the top surface of strap 12. To affix strap 12 around thighs 14 (lap), the user grasps the pulltab 22 end of strap 12 in one hand with the label 20 facing into the palm. The free end of the strap 12 hangs down on the outside of a single thigh. With the opposite hand, the user reaches under the thighs 14, grasps the dangling end of the strap 12 and draws it up and over the single thigh so that the strap encircles the single thigh which is opposite the label end of strap component 12. The label end of the strap 12 with the hook strip 26 on its bottom side is then crossed over the lap so that male hook-and-loop strip 26 is brought into coacting attachment with the loop strip 24. (Details and enlarged view of this attachment are shown in FIG. 6.) When the strap 12 is secured around the thighs, the self-adhesive strip of loop material 16 which is adhered to the device 10 is brought to rest against the male mating strip 18 which is attached to the upper surface of the strap 12. By this means, the device 10 is held securely in the user's lap.

To release the device 10 from its connection to the strap, the user grasps the device 10 firmly in the hands and lifts it away from the male (hook) mating strip 18 which is attached to the strap 12. To release the strap 12 from around the thighs, the user grasps the pulltab 22 and pulls it away to break the coacting attachment of the hook strip 26 from the loop strip 24.

In the application shown in FIG. 7, the securement device is attached, adjusted, and released in the same manner as used in the double-thigh embodiment, as described in connection with FIG. 5. The single-thigh embodiment can make use of elasticized material in the strap 12a to produce sufficient tension to prevent unwanted rotation and movement of the strap 12a on the thigh.

In FIG. 8, the forearm embodiment of the securement device can make use of elasticized material in the strap 12b for the same reasons as in the single-thigh embodiment.

Figure 14:
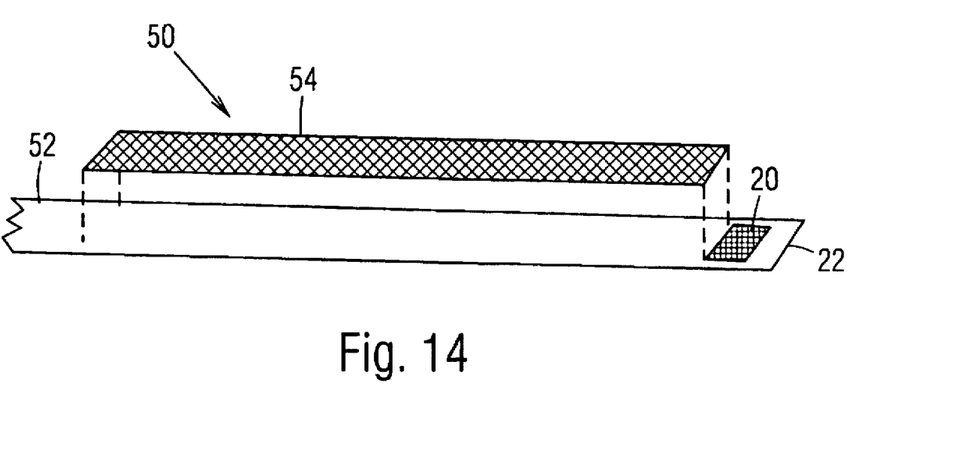
FIG. 14 is a perspective, fragmentary and exploded view showing a modified form of securement device of the invention.

FIG. 14 shows another form of securement device 50, with a modification discussed above. In this form of securement device, a strap 52 which may be in all other respects the same as the strap 12 described above and shown in other Figures, has a non-slip strip 54 (position shown in exploded view as indicated in dotted lines) on its upper, outer surface as a substitute for the male hook material 18 shown, for example, in FIGS. 2, 3, 5 and 6, as well as FIGS. 11, 12 and 13. The strap 52 may have hook and loop material affixed to it for other purposes as described above for retaining the strap to itself (e.g. FIG. 6). In this case a different provision can be made for holding the strap in a rolled configuration such as shown in FIG. 10; for example, a rubber band can be placed around the rolled strap or very small patches of male hook-type VELCRO material could be placed at the appropriate location for engagement by a small patch of loop-type VELCRO material (28 in FIGS. 5 and 6) on the bottom side of an end portion 22. Alternatively, a loop of polyester elastic braid can be sewn to the end of the strap, i.e. to the pull tab 22, in such a manner that when the strap is rolled into storage position, the elastic loop can encircle it to hold it compactly rolled. Such provision for roll retention is not shown in FIG. 14.

Figure 15:
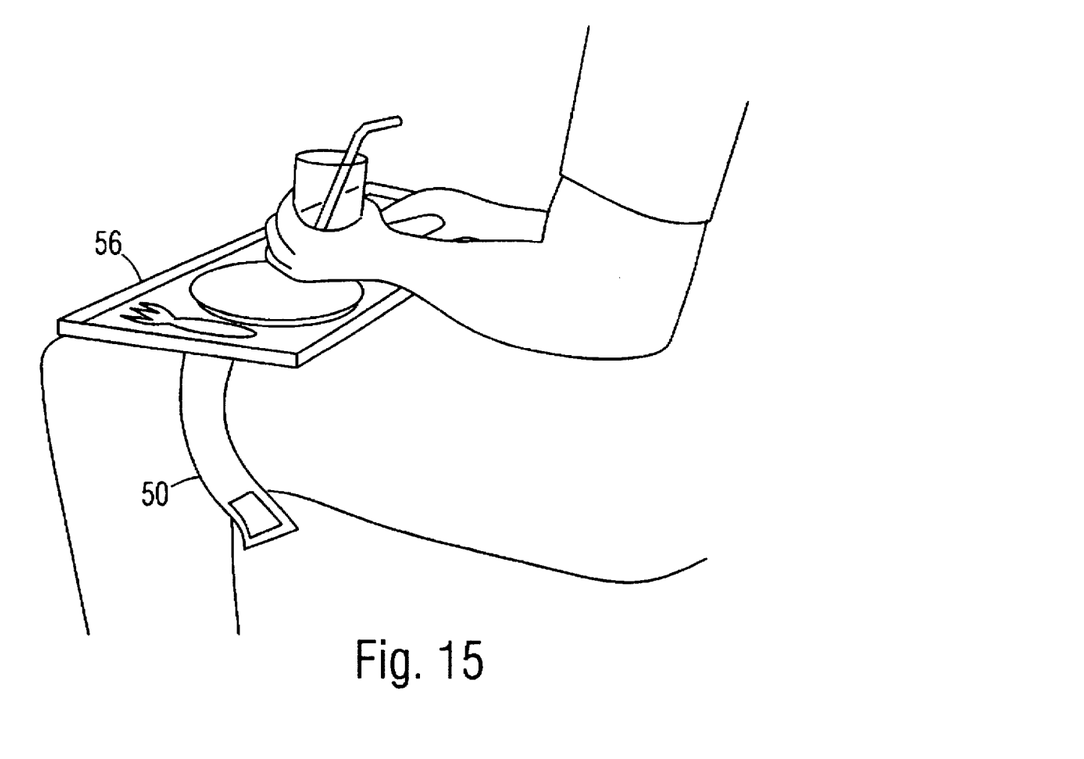
FIG. 15 is a perspective view showing use of the securement device to retain a lap tray on a person's legs.

The high friction non-slip material 54 can be the material sold under the trademark SLIPLOCK by American Non-Slip Products of Doraville, Ga. That material comprises an open mesh of fibers having a high friction PVC coating. The described non-slip material is extremely high in friction, and actually feels sticky to the touch, but is not an adhesive. The use of this form of the invention is particularly advantageous for items such as cafeteria trays which are to be held on the lap of dining persons, as shown in FIG. 15. However, the retention device 50 shown in FIG. 14 is also useful for retaining any of the products or devices referred to above, such as portable computers, calculators, clipboards, lap desks, other small electronic devices or any other hand-manipulable item which is advantageously placed on the lap of the user (as opposed to on a single arm such as in FIG. 8). The strap device 50 is useful when there is not such instability that the more rugged VELCRO hook and loop fastener attachment is needed. In particular, where the item for retention on the lap comprises a cafeteria tray 56 as in FIG. 15, it may not be practical to place hook or loop fastener material (see FIG. 2) on the bottom of a tray because it will be washed. There may be other reasons why it would be objectionable in some circumstances to place Velcro patches on the bottom of an item to be retained in the lap, such as a lap tray or lap desk. All that is required for lap retention by the strap device 50 is that the item to be retained in the lap have a relatively flat or smooth bottom surface for gripping by the non-slip strip 54.

On the other hand, even a washable cafeteria tray can be fitted with patches of hook or loop fastener material, if a suitable high-temperature, water and cleaner-resistant adhesive is used to install the patches. Thus, the first form of the invention can be used for cafeteria trays as well.

Accordingly, it can be seen that the device securement system of the invention provides a reliable, comfortable, lightweight, yet economical device that can easily be used and transported in most any setting.

Although the description above contains many specificities, these should not be construed as limiting the scope of the invention but as merely providing illustrations of some of the presently preferred embodiments of this invention. Various other embodiments are possible within its scope. For example, the securement device can be configured to secure any appropriately-sized object to the user's appendage(s), e.g., children's electronic games, calculators, books, trays, lap desks and other objects. Also, the device securement system can be applied around any other appropriately sized object in place of the appendage or appendages, e.g. an armrest in an automobile, a fold-down tray in an airplane, or other convenient connection locations. The securement device can be used in whatever position or setting the user finds comfortable, e.g., in bed with the knees drawn up. The strap may be of varied widths or multiple straps may be used for more rugged service, as explained above. The strap component of the securement device can be constructed from virtually any material that can function as a strap, e.g. leather, cloth, synthetics, plastic, or natural fibers. The components of the securement device can be of any color or produced to show forth any visual pattern. Also, the hook fabric and the loop fabric pieces could be reversed in position from what is described above and shown in the drawings, although the arrangement shown is preferred for the reasons stated above. Reversal of these components may require some protection of adjacent fabrics or the strap itself from the exposed hook material, but such reversal still would provide a system within the invention. Accordingly, the scope of the invention should be determined not by the embodiments illustrated, but by the claims and their legal equivalents.

We claim:

1. An attachment system for securing a portable electronic device to a user's body for enabling stable manipulation of the device by the user's hand or hands, comprising:

a portable electronic device having keys for enabling entry of information by two hands of the user, strap means of sufficient length to extend around and encircle two thighs of a user's legs, near the knees, with the user in a position with the legs separated as in a seated position, fastening means on the straps means, for securing the strap means to itself when the strap means is engaged around the thighs of the user, and device retention means, cooperative between a bottom surface of the portable electronic device and an upper surface of the strap means, for enabling quick-release retention of the portable electronic device directly to the strap means, whereby when the strap means is engaged and secured around the user's thighs and the portable electronic device is attached to the strap means, the user is able to stably retain the portable electronic device and to enter information into the portable electronic device with both hands.

2. The system of claim 1, wherein the device retention means comprises a set of strips of cooperating hook-and-loop fasteners including at least one hook strip and at least one loop strip, at least one of the strips being affixed to a bottom surface of the portable electronic device and at least one cooperating strip being affixed to an upper surface of the strap means which is a top surface in the strap means' position encircling said legs, and wherein at least one hook strip is affixed to the upper surface of the strap means, and at least one loop strip is affixed to the bottom surface of the portable electronic device and positioned for engagement with the hook strip on the strap means when the strap means is secured around the legs of the user's body, serving as the device retention means.

3. The system of claim 2, wherein the fastening means on the strap means comprises additional cooperating hook-and-loop fastener strips, including a strap fastening hook strip and a strap fastening loop strip, each positioned on one of (a) an underside of the strap means, near a first, outer end and (b) an upper side of the strap means generally toward a second, inner end.

4. The system of claim 3, wherein the fastening means on the upper side of the strap means generally toward the second, inner end comprises an elongated loop strip extending generally from the second, inner end back along the strap's upper surface for a sufficient distance to give the strap means a range of size adjustment to accommodate most users in engaging with the strap fastening hook strip, the fastening means on the underside of the strap means near the first, outer end comprising said strap fastening hook strip, positioned to engage with a portion of the elongated loop strip, whereby, when the second, inner end is placed on and wrapped around the legs of the user's body, the first, outer end of the strap means can be brought around the leg legs and to a position of engagement of the strap means with itself, via the strap fastening strips of hook-and-loop fastener material.

5. The system of claim 4, further including a small patch of loop fastener material on the underside of the strap means at said first, outer end, whereby the strap means may be rolled for storage with said second, inner end inside, and with said outer side of the strap means outside, and it may be secured in a rolled configuration by engagement of the small patch of loop fastener material with said at least one hook strip on the upper, outer side of the strap means.

6. The system of claim 1, wherein the portable electronic device comprises a portable computer with a keyboard adapted for two handed user input.

7. In combination, an attachment system for securing a hand-manipulable device to a user's body for enabling stable manipulation of the device by the user's hand or hands, comprising:

a hand-manipulable device, strap means of sufficient length to extend around and encircle two thighs of the user, with the user in a position with the legs separated as in a seated position, fastening means on the straps means, for securing the strap means to itself when the strap means is engaged around the two thighs of the user, and device retention means cooperative between a bottom surface of the hand-manipulable device and an upper surface of the strap means, for enabling quick-release retention of the hand-manipulable device directly to the strap means, whereby when the hand-manipulable device is attached to the strap means encircling both thighs of the user, the user is able to manipulate the hand-manipulable device with both hands in a stable manner.

8. The system of claim 7, wherein the device retention means comprises a set of strips of cooperating hook-and-loop fasteners including at least one hook strip and at least one loop strip, at least one of the strips being affixed to a bottom surface of the hand-manipulable device and at least one cooperating strip being affixed to an upper surface of the strap means which is a top surface in the strap means' position encircling both of the user's thighs.

9. The system of claim 8, wherein the hand-manipulable device comprises a portable computer with a keyboard adapted for two handed user input.

10. The system of claim 7, wherein the fastening means on the strap means comprises cooperating hook-and-loop fastener strips, including a strap fastening hook strip and a strap fastening loop strip, each positioned on one of (a) an underside of the strap means, near a first, outer end and (b) an upper side of the strap means generally toward a second, inner end.

11. A method for releasably attaching a portable electronic device to a seated user's legs and for operating the device in a steady manner comprising:

a) encircling a seated user's thighs, with a flexible strap, the strap having quick-release device retention means on an upper side, b) attaching one end of the strap to a fastening means affixed to the strap in order to secure the strap in a configuration encircling both the user's thighs, c) placing a portable electronic device, having a cooperating device retention means on its bottom side, onto the device retention means of the strap means, to thus stably secure the electronic device to the thighs, and d) the user's operating the portable electronic device by manipulation of the device with the device secured to the user's thighs with the flexible strap.

12. The method of claim 11, wherein the portable electronic device is a portable computer with a keyboard adapted for two-handed user input.

\* \* \* \* \*